United States Patent

Nordentoft

[11] 4,022,238
[45] May 10, 1977

[54] PRESSURE COMPENSATING DEVICE FOR MIXING FAUCETS

[75] Inventor: Lars Nordentoft, Menden, Germany

[73] Assignee: ITT Industries, Inc., New York, N.Y.

[22] Filed: Nov. 6, 1975

[21] Appl. No.: 629,484

[30] Foreign Application Priority Data

Dec. 14, 1974 Germany .......................... 2459317

[52] U.S. Cl. .............................................. 137/98
[51] Int. Cl.² ................. G05D 11/00; F16K 31/365
[58] Field of Search .............. 137/98, 100; 251/61; 138/46

[56] References Cited

UNITED STATES PATENTS

| 790,584 | 5/1905 | Manning et al. ..................... 137/98 |
| 2,145,114 | 1/1939 | Gibbs et al. ..................... 138/46 X |
| 3,006,378 | 10/1961 | Erickson et al. ..................... 138/46 |
| 3,135,280 | 6/1964 | Kozel ..................... 137/98 |
| 3,326,242 | 6/1967 | Parkison ..................... 138/46 |
| 3,688,790 | 9/1972 | Esten ..................... 137/98 |

Primary Examiner—William R. Cline
Attorney, Agent, or Firm—James B. Raden; William J. Michals

[57] ABSTRACT

A pressure compensating device is disclosed for mixing faucets. The device includes a diaphragm against which the medium to be compensated flows in a housing. The diaphragm is fitted with a throttle plate of flexible material on each side. Each throttle plate includes apertures which widen towards the diaphragm to aid in pressure compensation. Each throttle plate is securely fastened at its edges to the diaphragm and the casing and is secured at its center by a pin and spacers to the center of the diaphragm.

5 Claims, 4 Drawing Figures

PRESSURE COMPENSATING DEVICE FOR MIXING FAUCETS

BACKGROUND OF THE INVENTION

1. Field of the Invention

The invention relates to the provision of pressure compensation for mixing faucets and similar devices employing a diaphragm against which the medium to be compensated flows in a housing.

Such pressure compensation devices are required, in particular, for use in hot and cold water mixing faucets in the field of sanitary ware. As a rule, such devices are arranged in the hot and cold water pipes before the actual mixing control for hot and cold water. The primary function of these devices is to compensate for variations in pressure caused by changes in the cross-sectional flow which normally occur in water pipes and thus to ensure that a constant mixture can be obtained in the mixing faucet and that the emergent water mixture will have a constant temperature.

2. Description of the Prior Art

A device of this kind is known in which a piston sealed with a packing collar is movably mounted in a cylinder. In the direction of its axis, the piston has a valve cone, which works in conjunction with a valve seat arranged in the cylinder casing, on a valve stem at each side. When the pressure in the water supply pipe changes, this difference in pressure causes the piston to move in the cylinder, changing the flow cross-sections at both valves conversely.

It is also known that a diaphragm has to be provided to control the pressure compensation, this diaphragm being coupled to a double valve cone. When using this double valve cone, it is essential that the cone be mounted sealed with a sealing ring to separate the two media in the casing.

In the case of these known devices, it is disadvantageous that the control elements have to be movably mounted with packing rings in the casing so that these control elements become tight in a relatively short period of time, particularly in the case of sanitary fittings, because of impurities or lime precipitations from the water and their actuation responsiveness falls considerably or even fails completely because the packing ring sticks.

SUMMARY OF THE INVENTION

The invention is intended to eliminate the disadvantages described above for known pressure compensation devices and to render the device insensitive to impurities and the lime deposits.

According to the invention, this is brought about by providing a throttle plate of flexible material with apertures widening towards the diaphragm on either side of the diaphragm, these plates being firmly fixed at the edges in the casing and concentric to the diaphragm. The plates are connected to the diaphragm by a pin and spacers. Additional aspects of the invention will be clear from the dependent claims.

The advantages obtained by the invention consist particularly in the fact that the flow cross-section changes are obtained by distorting the plates because of the arrangement of throttle plates firmly fixed in the casing and avoiding a displacement of a piston, fitted with packing collar, etc., in a drill hole. Because the throttle plates bend outwards, no deposits can settle thereon, these deposits being dislodged and swept away by the varying distortions of the plates. The manufacture is also simplified considerably, for example, by the fact that close manufacturing tolerances are dispensed with.

By forming the pressure compensation plates of a suitable, flexible material such as, for example, rubber, it can be brought about that the second line is also closed if the pressure drops drastically or if the liquid supply is completely exhausted such as can occur, for example, in the event of water supply failure in a pipe. In this way a safety mechanism against scalding or cold shock is provided.

DESCRIPTION OF THE DRAWINGS

An embodiment of the invention will be described in greater detail below in conjunction with the figures, in which.

DESCRIPTION OF A PREFERRED EMBODIMENT

Figure 1:
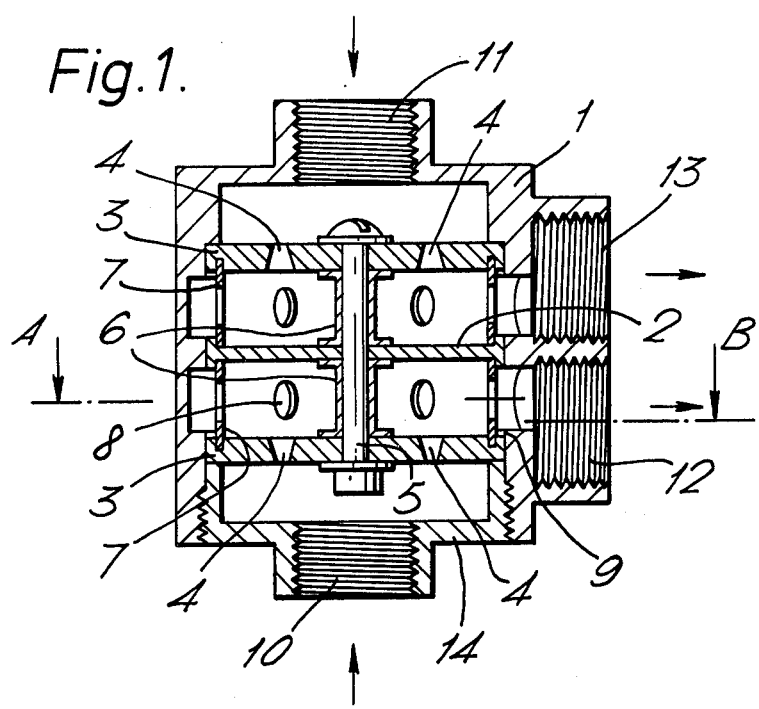
FIG. 1 shows the longitudinal section of a pressure compensation device.
Figure 2:
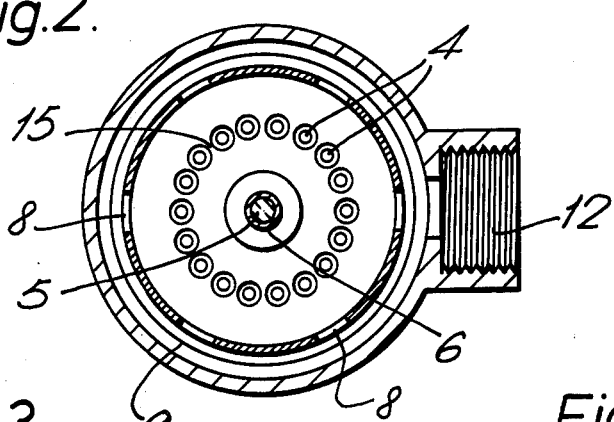
FIG. 2 shows a section through the line A-B in FIG. 1.

A pressure compensating element is housed in a casing 1 with inlet apertures 10 and 11 and drain-off apertures 12 and 13 in a drill hole 9. This pressure compensating element consists of a diaphragm 2 firmly fixed and sealed centrally in the casing along with two throttle plates 3. The throttle plates are connected to the diaphragm by means of a pin 5 and spacers 6 for spacing. To provide a tight fit in the drill hole 9 in the casing 1, the throttle plates are tightly fitted to the spacer rings 7, provided with apertures 8, by a screwed in cover 14. The throttle plates have tapered apertures 4 widening towards the diaphragm 2 on a hole circle 15.

If two media, for example, hot and cold water, are admitted to the throttle device, the pressure compensation device suffers no distortion if the pressures are the same (as shown in FIG. 1). If there is a difference in pressure, the diaphragm 2 is deflected towards the side on which the lesser pressure prevails. The two throttle plates 3 are coupled to the diaphragm by the pin 5 and the spacers 6 and are deformed in a manner corresponding to that of the diaphragm. Thus, the tapered drill holes 4 on the pressure-increase side are decreased in cross-section and those on the pressure-decrease side are increased so that the two pressures are balanced.

Figure 3:
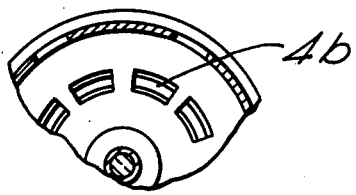
FIG. 3 shows part of a throttle plate with segment-like tapered ring apertures.
Figure 4:
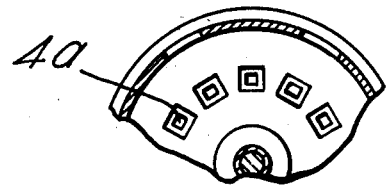
FIG. 4 shows part of a throttle plate with pyramid-shaped apertures.

Because of their correspondingly soft form, the diaphragm and the throttle plates can also shut off the second remaining pressure source if the first source fails completely. This provides security against scalding or cold shocks which is necessary in the case of sanitary fittings, in particular thermostatically controlled mixing valves, to prevent injuries to persons. Throttle plates are shown in FIGS. 3 and 4 in which the apertures of the one are shown as segment-like, tapered ring shaped, 4b, whereas those of the other are pyramid-shaped 4a. The present invention is not restricted to the field of sanitary fittings but can also be used to provide pressure compensation for gases, etc.

While the principles of the invention have been described above in connection with specific apparatus and application, it is to be understood that this description is made only by way of example and not as a limitation on the scope of the invention.

I claim:

1. A pressure compensation device for fluid mixing valves comprising:

a hollow housing including first and second inlet openings thereon respectively communicating with first and second outlet openings thereon;

a flexible diaphragm mounted within said housing and separating said first inlet and said first outlet from said second inlet and said second outlet, thereby to form first and second chambers in said housing separated by said diaphragm;

each chamber including a flexible throttle plate mounted therein, said throttle plate being fixedly mounted at its peripheral edge portion to said chamber thereby sealingly separating the inlet opening from the outlet opening, and said throttle plate having a plurality of tapered apertures therein which open toward said outlet opening for conducting fluid therethrough and wherein the cross-sectional area of said apertures decreases when said throttle plate flexes toward said outlet opening in response to fluid pressure at said inlet opening; and means cooperating with said diaphragm for interconnecting said throttle plates wherein translation of one of said throttle plates provides an opposite translation of the other of said throttle plates, whereby said other of said throttle plates flexes away from its corresponding outlet opening when said one of said throttle plates flexes toward its corresponding outlet opening.

2. The device according to claim 1, wherein said diaphragm and said throttle plates are concentrically mounted within a generally cylindrical portion of said housing and wherein said means for interconnecting said throttle plates comprises a pin coaxially mounted within said housing with each end of said pin being fastened to a respective one of said throttle plates and said pin being carried by said diaphragm in force transmitting relationship therewith.

3. The device according to claim 2, wherein said pin carries a pair of coaxially mounted spacers respectively mounted in one of said chambers between one of said throttle plates and said diaphragm.

4. The device according to claim 3, in which said apertures are formed as annular angularly spaced segments.

5. The device according to claim 3, in which said apertures are formed as angularly spaced four-sided pyramidal-shaped holes.

* * * * *